Oct. 14, 1952  F. W. AVILA  2,613,954
TORSION-TYPE AXLE SUSPENSION FOR TANDEM AXLE VEHICLES
Filed Aug. 30, 1947  3 Sheets-Sheet 2

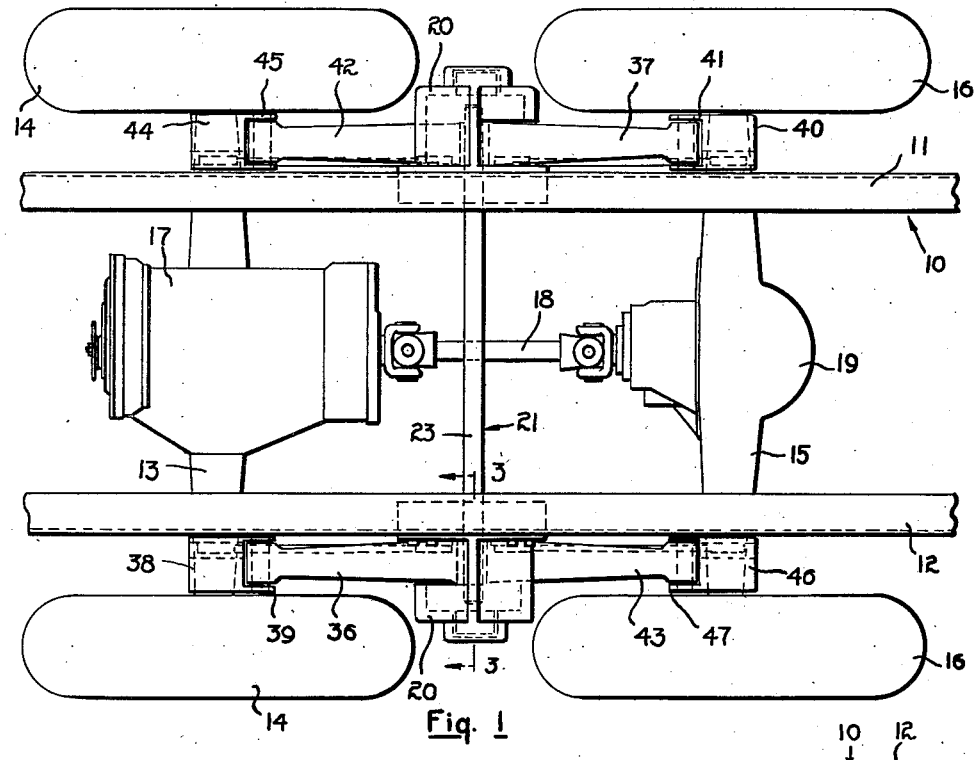

INVENTOR.
Frank W. Avila
BY Paul O. Pippel
Atty.

Patented Oct. 14, 1952

2,613,954

UNITED STATES PATENT OFFICE 2,613,954

TORSION-TYPE AXLE SUSPENSION FOR TANDEM AXLE VEHICLES

Frank W. Avila, Columbia City, Ind., assignor to International Harvester Company, a corporation of New Jersey Application August 30, 1947, Serial No. 771,435

8 Claims. (Cl. 280—104.5)

The invention relates to an axle suspension system for a vehicle, particularly a vehicle of the type including tandem or bogie wheels.

The invention relates broadly to improvements in suspension systems of the type depending upon elements in torsion as distinguished from conventional coil or leaf springs, and is concerned primarily with providing a simple and improved torsion means interconnecting the axles of a bogie-type carrying unit. The invention is characterized by the provision of a pair of torsion units, one of which extends across the vehicle frame and has its opposite ends connected respectively to different axles; the second unit also extends across the frame and has its opposite ends respectively connected to different axles in opposition to the connections of the first unit. In other words, the right-hand end of one torsion unit is connected to the forward axle and the left-hand end is connected to the rearward axle; the right-hand end of the second unit is connected to the rearward axle and the left-hand end of the second unit is connected to the forward axle.

The foregoing and other important objects and desirable features inherent in and encompassed by the invention, together with many of the purposes and uses thereof, will become readily apparent from a reading of the ensuing description in conjunction with the annexed drawings.

In the drawings, wherein there are shown by way of example two preferred forms of the invention:

Figure 1 is a plan view of the rear portion of a vehicle.

Figure 2 is a side elevational view of the same.

Figure 3 is an enlarged transverse fragmentary sectional view taken on the line 3—3 of Figure 1.

Figures 1, 2 and 3

Figure 4:
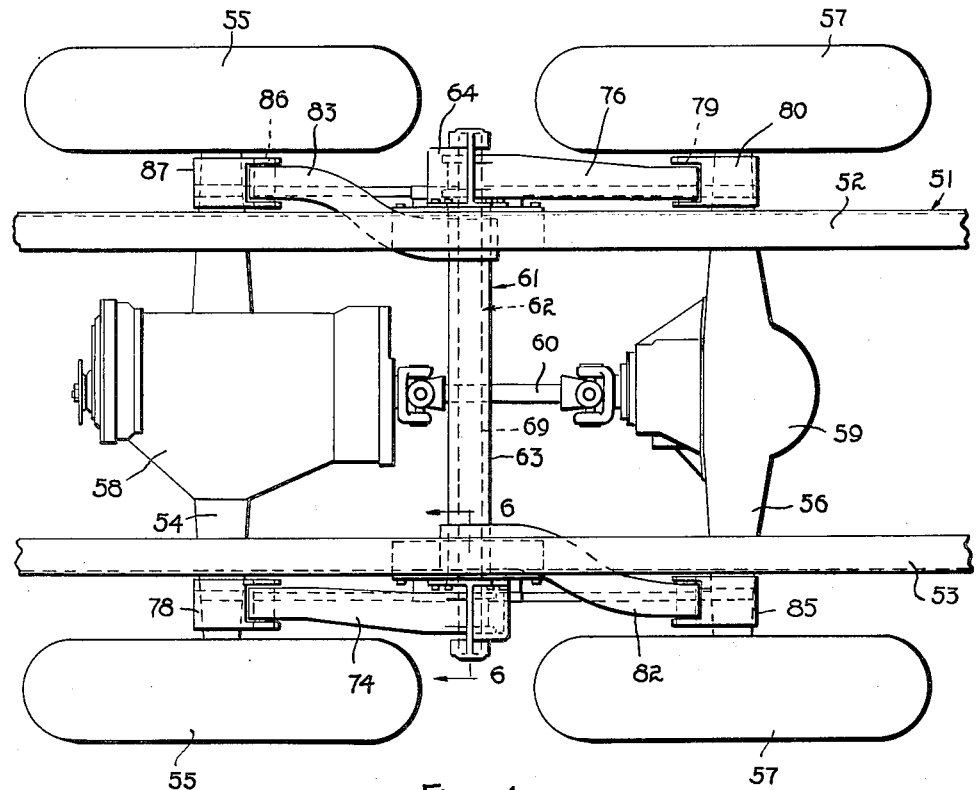
Figure 4 is a view similar to that shown in Figure 1 but illustrating a modified form of the invention.

In this form of the invention the axle suspension system is used in connection with the rear end of a vehicle; although, it will be understood that the suspension system may be just as readily applied to other instances in which the characteristics of the system are desirable. The vehicle includes a longitudinal main frame 10 having a pair of parallel longitudinally running transversely spaced side frame members 11 and 12. As viewed from the rear of the vehicle and facing forwardly thereof, the frame member 11 is at the right-hand side and the member 12 is at the left-hand side. This reference to the opposite sides of the vehicle will be continued throughout the description.

The vehicle is carried on a bogie unit including a first or forward axle 13 provided with wheels 14 and a rear or second axle 15 having wheels 16. The forward axle includes the usual differential gear casing 17 which may be connected by a short propeller shaft 18 to a differential casing 19 included in the rear axle 15. The gearing in the forward differential casing 17 may be connected in the usual manner to a propeller shaft (not shown).

The main frame 10 is provided with supporting structure including a pair of brackets 20 preferably in the form of castings rigidly secured to the frame members 11 and 12. These castings are in transverse alinement intermediate the front and rear axles 13 and 15 and serve to carry a pair of torsion units indicated generally by the numerals 21 and 22. The torsion unit 21 includes a transverse torsion member or bar 23 which extends transversely across the frame 10 and has its opposite end portions projecting respectively beyond the frame members 11 and 12. As best shown in Figure 3, each casting or bracket 20 includes an inner depending portion 24 and an outer depending portion 25 spaced transversely outwardly from the portion 24. The portion 25 of the bracket is provided with a recess 26 which accommodates a bearing member 27. The member 27 is carried in the recess 26 by bearing means here shown as needle bearings 28.

The bearing member 27 is further provided with a pair of vertically alined inwardly opening recesses 29 and 30. The recess 29 carries bearing means 31 for receiving the end of the torsion bar 23. The recess 30 includes a bearing 32 for receiving the end of a torsion bar 33 included in the torsion unit 22. The bearings 31 and 32 are here shown as needle bearings; although, as in the case of the bearings 28, any suitable bearing may be employed. The inner depending portion 24 of the bracket 20 is apertured at 34 and 35 respectively in alinement with the recesses 29 and 30, so that the torsion bars 23 and 33 may pass therethrough and respectively into the bearings 31 and 32. The structure at the opposite side of the vehicle frame 10 is the same as that just described, and the opposite ends of the torsion bars 23 and 33 are similarly carried in the right-hand bracket 20.

The left-hand end of the torsion bar 23 has rigidly connected thereto a longitudinally forwardly extending suspension arm 36, and the right-hand end of the bar has rigidly secured thereto a longitudinally rearwardly extending suspension arm 37. The connections between the arms 36 and 37 and the torsion bar 23 may be made in any suitable manner, preferably by keys (not shown). The left-hand end of the forward axle 13 rigidly carries a bracket 38 having a pair of apertured ears 39 to which the forward end of the suspension arm 36 is pivotally connected. The right-hand end of the rear axle 15 includes a similar bracket 40 having a pair of apertured ears 41 to which the rear end of the arm 37 is pivotally connected.

The other torsion unit 22 is provided respectively at opposite ends with a pair of suspension arms, the right-hand arm being designated by the numeral 42 and the left-hand arm being designated by the numeral 43. The right-hand end of the forward axle 13 includes rigidly thereon a bracket 44 having a pair of apertured ears 45 to which the forward end of the arm 42 is pivotally connected. The left-hand end of the rear axle rigidly carries a bracket 46 having a pair of apertured ears 47 to which the rear end of the left-hand arm 43 is pivotally connected.

The depending portions 24 of the brackets 20 extend downwardly to a point below the bracket portions 25, and each is provided with a pair of longitudinally spaced bearing portions 48, for the purpose of pivotally accommodating longitudinally extending radius rods 49, the opposite ends of which are pivotally connected to depending ears 50 on the axle brackets 38, 40, 44, and 46. The radius rods 49 cooperate with the suspension arms 36, 37, 42, and 43 in controlling vertical movement of the axles as they rise and fall with respect to the vehicle frame.

It will be noted that the torsion units are journaled and not rigidly carried on the frame 10. This characteristic of the structure is accomplished by that feature of the invention that resides in oppositely connecting the ends of each torsion unit to the axles; that is to say, the connections including relationship between the left-hand arm 36 and forward axle 13 and the relationship between the right-hand arm 37 and rear axle 15; the same being true with respect to the arms 42 and 43 and the opposite ends of the axles 13 and 15. When the vehicle encounters a marked unevenness in the road over which it travels, the forward wheel 14 will ride over the unevenness and will thus tend to raise with respect to the vehicle frame. Movement of the axle 13, for instance, at the left-hand side of the vehicle, will be guided by the suspension arm 36 and proximate radius rod 49. The torsion bar 23 will tend to resiliently resist upward movement of the left-hand end of the axle 13, and reaction will occur through the arm 37 to the right-hand end of the rear axle 15, thus evenly distributing the force resulting from the uneven ride. When the left-hand wheel 16 subsequently encounters the unevenness, the torsional reaction is accomplished through the arm 43, torsion bar 33, and opposite arm 42 to the right-hand end of the front axle 13. The same equal distribution of forces occurs when the vehicle is loaded. In short, the system employs a reaction between opposite ends of different axles.

Figure 5:
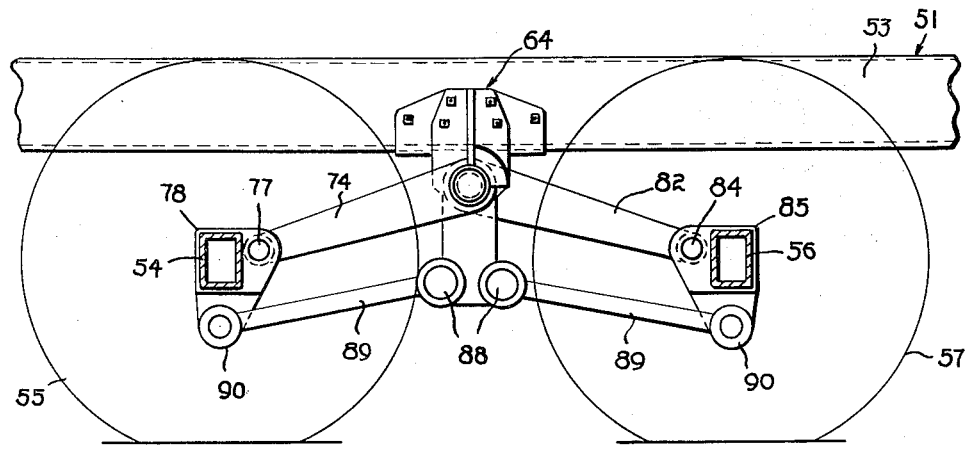
Figure 5 is a side view of the structure shown in Figure 4.
Figure 6:
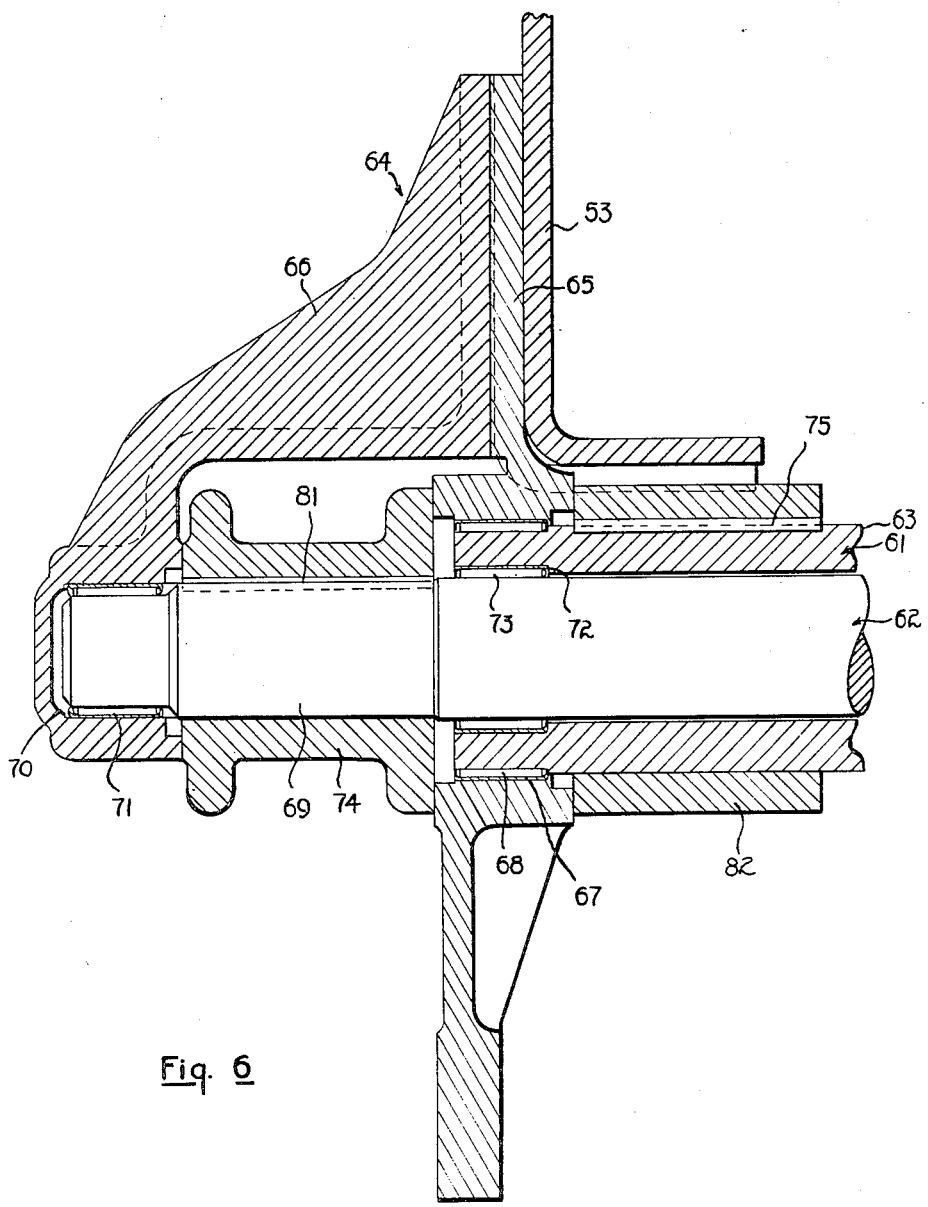
Figure 6 is an enlarged fragmentary transverse sectional view taken substantially on the line 6—6 of Figure 4.

*Figures 4, 5, and 6*

Although the vehicle with which this form of the invention is employed is similar to that described in connection with Figures 1, 2, and 3, different reference characters will be employed for the purposes of clarity. The vehicle includes a longitudinal main frame 51 having a right-hand longitudinal main frame member 52 and a left-hand longitudinal frame member 53. The frame 51 is carried on a bogie unit including a forward axle 54 having wheels 55 and a second or rear axle 56 having wheels 57. The axles may be interconnected for driving purposes by appropriate means including a gear housing 58 on the forward axle, a gear housing 59 on the rear axle, and a short propeller shaft 60 between the housings.

The axles are connected to the vehicle frame 51 by a suspension system including first and second torsion units 61 and 62. The first unit 61 includes a tubular torsion member 63 extending transversely across the main frame members 52 and 53 on an axis intermediate the front and rear axles 54 and 56. Each of the main frame members carries a supporting element in the form of a bracket indicated generally by the numeral 64 preferably comprising inner and outer castings 65 and 66. The inner casting 65 depends below the proximate frame member and is apertured at 67 to receive low-friction means in the form of a needle bearing 68. The bearing 68 journals the end of the tubular torsion member 63 (Figure 6). The opposite end of the member 63 is similarly carried by the bracket 64 on the other frame member 52.

The second torsion unit 62 includes a torsion bar 69 which passes axially through the torsion member 63 and projects at its opposite ends beyonds the ends of the member 63 and beyond the sides of the main frame 51. The outer casting 66 of the bracket 64 extends downwardly in axial alinement with the bearing 68 in the inner casting 65 and is recessed at 70 to carry low-friction means in the form of a needle bearing 71. The outer end of the torsion bar 69 is reduced and is journaled in the bearing 71. The opposite end of the bar 69 is similarly carried in a similar bearing in the bracket 64 at the other side of the frame. The outer end of the tubular torsion member 63 is internally recessed at 72 and is provided with bearing means in the form of a needle bearing 73 for journaling one torsion member on the other. The bearing means 73 is in vertical alinement with the bearing means 68 between the casting 65 and the tubular torsion member 63.

The left-hand end of the tubular torsion member 63 carries a longitudinally rearwardly extending suspension arm 82. The connection between the arm 82 and the end of the tubular member 63 is preferably accomplished by a key 75 (Figure 6). The right-hand end of the member 63 is connected to a longitudinally forwardly extending suspension arm 83, the connection also being accomplished by a key (not shown). The rearward end of the left-hand suspension arm 82 is pivotally connected at 84 to a pair of apertured ears provided on a bracket 85 rigidly carried on the left-hand end of the rear axle 56. The forward end of the suspension arm 83 is pivotally connected at 86 to a pair of apertured ears provided on a bracket 87 rigidly carried by the right end of the forward axle 54.

That portion of the left-hand end of the torsion bar 69 that lies between the transversely spaced portions of the castings 66 and 65 is rigidly connected as by means of a key 81 to an end of a longitudinally forwardly extending suspension arm 74. The other end of the torsion member 69 is similarly connected to one end of a longitudinally rearwardly extending suspension arm 76. The forward end of the arm 74 is pivotally connected at 77 to a pair of apertured ears on a bracket 78 rigid on the left-hand end of the forward axle 54. The rearward end of the right-hand arm 76 is pivotally connected at 79 to a pair of apertured ears provided on a bracket 80 rigidly carried on the right-hand end of the rear axle 56.

The inner casting 65 of each bracket 64 depends to a point considerably below the torsion bars or members 63 and 69 and is provided with a pair of longitudinally spaced pivots 88 providing connections for the ends of radius rods 89. The radius rods extend longitudinally and are pivotally connected to depending ears 90 on the axle brackets 78, 80, 85, and 87. The radius rods 89 are similar in structure and function to the radius rods 49 of Figures 1, 2, and 3.

Likewise the structural and functional characteristics of the suspension system just described are similar to those of the suspension system of Figures 1 to 3. An important feature of the invention, in addition to those features previously set forth, resides in the mounting of the torsion units on the frame and particularly in the relationship between the bearings 68 and 73. Also of importance is the mounting of the suspension arms 74 and 76 with respect to the castings 65 and 66 of the supporting brackets 64. These details of construction provide for simplicity and strength in the construction. The arrangement is furthermore such that the units may be easily disassembled for repair or replacement.

*Summary*

The embodiments of the invention chosen for the purposes of illustration and description herein are those preferred as the result of selective tests based upon requirements for achieving the objects of the invention and developing the utility thereof in the most desirable manner, due regard being had to existing factors of economy, simplicity of design and construction, production methods and the improvements sought to be effected. It will be appreciated, therefore, that the particular structural and functional aspects emphasized here are not intended to exclude, but rather to suggest, such other adaptations and modifications of the invention as fall within the spirit and scope of the invention as defined in the appended claims.

What is claimed is:

1. For a vehicle having a longitudinal main frame and first and second transverse axles spaced longitudinally of the frame: an axle suspension system, comprising a first torsion member extending across the frame and having right and left-hand connecting arms respectively at opposite sides of the frame connected to the first and second axles; a second torsion member extending across the frame and having right and left-hand connecting arms respectively at opposite sides of the frame connected to the second and first axles; and means for supporting said members including, a pair of transversely spaced supports rigidly connected to the frame with each support including an outer bearing portion and a transversely spaced inner bearing portion rigidly formed therewith into which opposite end portions of the torsion members are received and journaled.

2. The suspension system defined in claim 1, in which: each of the outer bearing portions of the transversely spaced supports carries a bearing member journaled in a recess therein and having said bearing member adapted for journaling proximate ends of said torsion members.

3. The suspension system defined in claim 1, in which: each of the transversely spaced supports is provided with an inner apertured bearing portion through which the proximate ends of the torsion members pass and are journaled and an outer bearing portion provided with a recess, and a member carried in said recess that includes a pair of bearing portions one above and one below the horizontal axes thereof for receiving the proximate ends of the torsion members that pass through said inner portion.

4. The suspension system defined in claim 1, in which: each right and left-hand connecting arm is connected to its respective torsion member at a point disposed intermediate said inner and outer bearing portions of the proximate supporting members.

5. For a vehicle having a longitudinal main frame and first and second transverse axles spaced longitudinally of the frame: an axle suspension system comprising, a tubular torsion member extending across the frame between the axles; a second torsion member passing axially through the tubular member and projecting at opposite ends beyond opposite ends of said tubular member; a first pair of longitudinal suspension arms respectively fast to opposite end portions of the tubular torsion member; means connecting each arm to an axle; a second pair of longitudinal suspension arms respectively fast to the opposite end portions of the second torsion member; means connecting each arm of said second pair of arms to an axle; a pair of transversely spaced supports rigidly connected to the frame for journaling opposite end portions of the torsion members, each support including an outer bearing portion formed integral therewith for journaling the proximate end of the second torsion member and a transversely spaced inner bearing portion for journaling the proximate end of the tubular torsion member.

6. The suspension system defined in claim 5, in which: a pair of radially spaced low-friction bearing means is provided between the torsion members, each of said bearing means being located in proximity to the inner bearing portion of the proximate support.

7. The suspension system defined in claim 5, in which: each suspension arm on the second torsion member only is fast thereto at the portion thereof disposed between the inner and outer bearing portions of the proximate support.

8. For a vehicle having a longitudinal main frame and first and second transverse axles spaced longitudinally of the frame: an axle suspension system, comprising a first torsion member extending across the frame and having right and left-hand connecting arms respectively at opposite sides of the frame connected to the first and second axles; a second torsion member extending across the frame and having right and left-hand connecting arms respectively at opposite sides of the frame connected to the second and first axles; and means for supporting said members including, a pair of transversely spaced supports rigidly connected to the frame with each support having an outer bearing portion formed integral therewith and an inner bearing portion each adjacent corresponding end portions of the torsion members and spaced apart axially thereof, each outer bearing portion being adapted to receive and journal a proximate end portion of at least one of the torsion members, and each inner bearing portion being adapted to receive and journal a corresponding end portion of each of the torsion members.

FRANK W. AVILA.

REFERENCES CITED

The following references are of record in the file of this patent:

UNITED STATES PATENTS

| Number | Name | Date |
|---|---|---|
| 1,893,695 | Chenoweth | Jan. 10, 1933 |
| 2,083,381 | Hutchison, Jr. | June 8, 1937 |
| 2,251,698 | Willson | Aug. 5, 1941 |
| 2,254,261 | Best | Sept. 2, 1941 |
| 2,342,110 | Barber | Feb. 22, 1944 |
| 2,401,568 | Junkin | June 4, 1946 |